Figure 1:
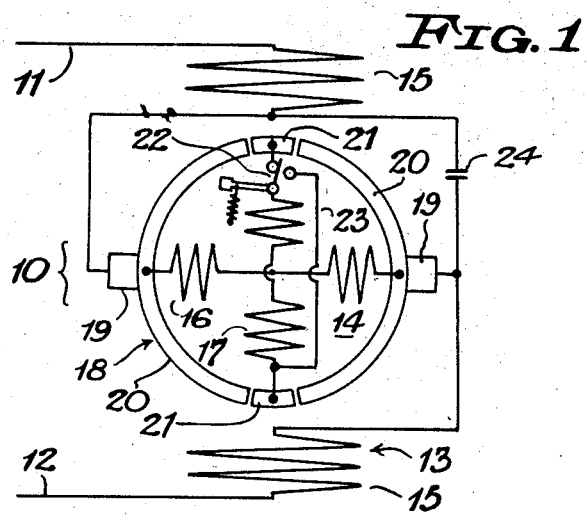

June 16, 1959 — R. LEE — 2,891,207
SYNCHRONOUS ELECTRIC MOTORS
Filed Oct. 28, 1957

INVENTOR.
ROYAL LEE
BY
ATTORNEY

United States Patent Office 2,891,207
Patented June 16, 1959

2,891,207

SYNCHRONOUS ELECTRIC MOTORS

Royal Lee, Elm Grove, Wis., assignor to Lee Foundation for Nutritional Research, Milwaukee, Wis.

Application October 28, 1957, Serial No. 692,939

6 Claims. (Cl. 318—186)

This invention relates to alternating current motors of the synchronous type.

An object of the invention is to provide a simple and inexpensive synchronous motor suitable for energization from a single-phase alternating current source and which is so arranged as to furnish ample starting torque and to afford a smooth transition to synchronous operation.

Another objection is to provide a synchronous motor having commutated starting winding means which also forms a field winding and a damper winding.

A further object is to provide a synchronous motor having a commutator which is effective during starting and which also forms a synchronous rectifier for energizing a field winding of the motor.

The invention further consists in the several features hereinafter described and claimed.

Figure 2:
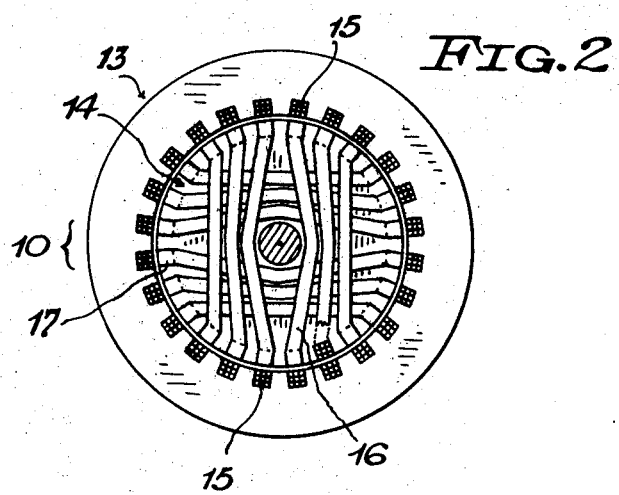

In the drawing,

Fig. 1 is a diagrammatic view showing a form of synchronous motor embodying the invention, and Fig. 2 is a transverse sectional view of the motor.

In the drawing, the numeral 10 designates generally a synchronous motor of the invention adapted for energization from single-phase supply conductors 11 and 12. The motor comprises a stator 13 and a rotor 14, each of which includes a slotted laminated core. The stator is shown to be of the two-pole type and is provided with a two-section winding 15, here shown to be of the distributed type placed in slots in the stator core. However, in some instances the stator may be of the salient pole type. The rotor has two electrically distinct shuttle-type windings 16 and 17 angularly related about the rotor axis, preferably in quadrature, and disposed in slots in the rotor core. The two shuttle windings may fill most or all of the rotor core slots.

The rotor is provided with a four-segment commutator 18 on which bear diametrically opposite brushes 19. The commutator comprises two opposite segments 20 permanently connected to the opposite terminals of the rotor winding 16, and two opposite segments 21 intervening the segments 20 and connected to the opposite terminals of the rotor winding 17, as hereinafter described, the two pairs of commutator segments being arranged at right angles to each other. The commutator segments 20 are preferably considerably longer in a peripheral direction than the segment 21, and the latter segments have a peripheral dimension at least slightly greater than the brush width or diameter. The commutator may be either of the drum type or the disk type.

The rotor is connected in series with the stator winding 15 by the brushes 19 and is here shown to be interposed between the two stator winding sections. If desired, the brushes may be angularly adjustable to minimize sparking.

The circuit extending through the rotor winding 17 from the commutator segments 21 includes a speed-responsive switch 22, such as of the centrifugal type. The switch 22, which is preferably connected between a terminal of the rotor winding and one of the commutator segments 21, serves in a first position to establish the circuit through the rotor winding 17 and commutator segments 21 during the starting period of the motor, and serves in a second position to open this circuit and to short-circuit at least a part, and preferably all, of the rotor winding 17 through a conductor 23 during synchronous operation of the motor, the short-circuited rotor winding then forming a damper winding. For this purpose the centrifugal switch is actuated to its second position when the motor is near its synchronous speed. In the case of a two-pole motor energized from a 60-cycle source the synchronous speed is 3600 r.p.m.

In operation, the motor starts as a series-type motor, the current in both of the rotor or armature windings 16 and 17 contributing to the torque. After the motor quickly accelerates to approximately synchronous speed, the centrifugal switch 22 is actuated to its second position in which it opens the circuit through the rotor winding 17 and commutator segments 21 and then short-circuits this rotor winding by way of the conductor 23. The rotor then runs at synchronous speed, the rotor winding 16 being supplied with unidirectional exciting current through the commutator segments 20 which form a synchronous rectifier, and the circuit being commutated at or near the zero points of the cycle. The short-circuited rotor winding 17 forms a damper winding to minimize hunting.

If the motor should be unduly overloaded it will drop out of synchronism but will continue to run at reduced speed as a series-type motor provided the load is not too great, and will resume synchronous operation when the excessive overload is removed.

In some instances a small capacitor 24 may be shunted across the brushes to minimize inductive sparking.

I claim:

1. A synchronous electric motor, comprising cooperating relatively rotatable first and second magnetizable members, said first member having winding means, said second member having first and second windings angularly related about the motor axis and having a commutator with first and second pairs of segments connected to the terminals of the respective first and second windings, brushes bearing on said commutator and connecting the winding means of said first magnetizable member in series with the windings of said second magnetizable member to start the motor as a series motor, speed-responsive switch means operable at approximately synchronous speed for opening the circuit extending through the second winding of said second magnetizable member and commutator and short-circuiting at least a part of said second winding to form a damper winding, said first pair of commutator segments forming rectifier means for supplying the first winding of said second magnetizable member with exciting current for synchronous operation of the motor.

2. A synchronous electric motor, comprising a stator having a winding, a rotor cooperating with said stator and having first and second windings angularly related about the rotor axis and further having a commutator with segments connected to said angularly related windings, brushes bearing on said commutator and connecting the wound stator in series with the wound rotor for starting the motor as a series motor, and speed-responsive switch means operable at approximately synchronous speed for opening the circuit extending through said second rotor winding and commutator and short-circuiting at least a part of said second rotor winding to form a damper winding, said commutator forming rectifier means for supplying said first rotor winding with exciting current for synchronous operation of the motor.

3. A synchronous electric motor, comprising a stator having a winding, a rotor cooperating with said stator and having a plurality of windings angularly related about the rotor axis and further having a commutator with segments connected to said rotor windings, brushes bearing on said commutator and connecting the wound stator in series with the wound rotor for starting the motor as a series motor, and speed-responsive switch means operable at approximately synchronous speed for short-circuiting a part of the rotor windings to form a damper winding.

4. A synchronous electric motor, comprising a stator having a winding, a rotor cooperating with said stator and having first and second windings angularly related about the rotor axis and further having a commutator with a first pair of opposite segments connected to the terminals of said first rotor winding and a second pair of opposite segments intervening said first pair of segments and connected to the terminals of said second rotor winding, said first pair of commutator segments being substantially longer in a circumferential direction than said second pair of segments, brushes bearing on said commutator and connecting the wound stator in series with the wound rotor for starting of the motor as a series motor, and speed-responsive switch means operable at approximately synchronous speed for opening the circuit through said second rotor winding and commutator and for short-circuiting at least a part of said second rotor winding to form a damper winding, said commutator forming rectifier means for supplying said first rotor winding with exciting current for synchronous operation of the motor.

5. A synchronous electric motor, comprising cooperating relatively rotatable stator and rotor members each having winding means adapted to be enerziged, commutating means for one of said winding means, means including said commutating means for starting the motor, and speed-responsive switch means operable at approximately synchronous speed for short-circuiting a part of the winding means of one of said members to form a damper winding effective during synchronous operation of the motor.

6. A synchronous electric motor, comprising cooperating relatively rotatable stator and rotor members, one of said members being provideded with alternating current winding means and the other member having winding means, commutating means for said last-named winding means, means including said commutating means for starting the motor, and speed-responsive means operable at approximately synchronous speed for converting said commutating means to rectifying means to supply said last-named winding means with unidirectional current for synchronous operation of the motor, said commutating means including brushes common to both the starting operation and the synchronous operation.

References Cited in the file of this patent

UNITED STATES PATENTS 552,313    Brown _____ Dec. 31, 1895